United States Patent [19]

Cicero et al.

[11] Patent Number: 4,997,891
[45] Date of Patent: Mar. 5, 1991

[54] HIGH TEMPERATURE RESISTANT FAST SOLDERING WIRE ENAMEL

[75] Inventors: Robert W. Cicero, Scotia, N.Y.; Tsutomu Iwasaki, Osaka, Japan; Kenneth C. Heckeler, Scotia, N.Y.; James M. Stanton, Lake Jackson, Tex.; Kunihiko Yanagihara, Ballston Spa, N.Y.

[73] Assignee: Schenectady Chemicals, Inc., Schenectady, N.Y.

[21] Appl. No.: 402,968

[22] Filed: Sep. 6, 1989

Related U.S. Application Data

[63] Continuation of Ser. No. 904,370, Sep. 9, 1986, abandoned.

[51] Int. Cl.$^5$ .............. C08F 283/04; C08G 69/48; C08L 75/00
[52] U.S. Cl. .................... 525/424; 428/379; 528/45; 174/110 S R
[58] Field of Search ............... 428/379, 383; 528/45, 528/288; 525/424

[56] References Cited

U.S. PATENT DOCUMENTS

| | | | |
|---|---|---|---|
| 2,982,754 | 5/1961 | Sheffer et al. | 428/379 |
| 3,174,950 | 5/1965 | Cordier | 428/379 |
| 3,342,780 | 9/1967 | Meyer . | |
| 3,426,098 | 2/1969 | Meyer et al. | 525/424 |
| 3,567,673 | 3/1971 | Payette | 525/424 |
| 3,869,428 | 3/1975 | Mosimann | 528/45 |
| 3,919,144 | 11/1975 | Formaini et al. | 525/424 |
| 4,110,297 | 8/1978 | Shelby et al. | 428/379 |
| 4,115,342 | 9/1978 | Shelby et al. | 428/379 |
| 4,247,429 | 1/1981 | Pauze et al. | 525/424 |
| 4,264,485 | 4/1981 | Ohm | 524/296 |
| 4,273,917 | 6/1981 | Zamek | 528/288 |
| 4,296,229 | 10/1981 | Pauze et al. | 525/424 |
| 4,362,861 | 12/1982 | Shen | 428/383 |

Primary Examiner—George F. Lesmes
Assistant Examiner—J. M. Gray
Attorney, Agent, or Firm—Cushman, Darby & Cushman

[57] ABSTRACT

A solderable polyurethane wire enamel composition comprising a mixture of a blocked isocyanate and polyesterimide resin wherein the ratio of isocyanate groups in the blocked isocyanate to hydroxyl groups in the polyesterimide resin is about 0.82:1 to about 5.7:1 and the hydroxyl to carboxylic acid ratio of the raw materials used in preparing the polyesterimide is about 1.4:1 to about 2.5:1.

20 Claims, No Drawings

HIGH TEMPERATURE RESISTANT FAST SOLDERING WIRE ENAMEL

This is a continuation of application No. 06/904,370, filed Sept. 8, 1986, which was abandoned upon the filing hereof.

The present invention relates to electrical insulating wire enamels which give high temperature resistance as well as fast soldering capability to a magnet wire when it is coated (insulated) by this enamel.

BACKGROUND OF THE INVENTION

Magnet wire is small diameter copper or aluminum wire coated with an insulating material known as wire enamel. The wire enamel usually is composed of a base resin and various additives which improve the properties and performance of the overall composition.

In the present electrical and electronics industry, large amounts of magnet wire are used in manufacturing motors, transformers, television yoke coils and many other products. The design of electrical equipment and machinery has required progressively smaller motors, coils, transformers and other products using magnet wire, and these operate at higher temperatures than larger structures. Therefore, the demand for higher temperature resistant magnet wire used in these electrical motors and transformers has been increasing. For present purposes, temperature resistance is defined in terms of the thermal index temperature measured according to ASTM D-2307 and/or NEMA (National Electrical Manufacturers Association) ratings.

A further requirement for such products, for many applications, is solderability of the free ends of magnet wire extending from such structures. It is important that the wire be capable of being soldered quickly.

In many areas of the industry, there is increased demand for precise quality control of products. This demand is leading the industry to turn to automated production. In the electrical and electronics industry, an automated production system has a significant place in whatever the product is. In handling these products where magnet wire is used, the questions of solderability temperature and speed of solderability of the magnet wire may determine how successfully an automated production line can be implemented.

Many types of wire enamel are known. These include conventional high-temperature enamels such as those in which the base resin is a polyimide, polyamideimide, polyesterimide (or polyesteramideimide) or polyester. There are two main types of polyesterimide wire enamels, and these differ in thermal classification. One type is a polyesterimide in which there are polyester units derived from polyfunctional aliphatic alcohols such as glycerine and trimethylolpropane as well as diols such as ethylene glycol. The polyester units also contain aromatic carboxylic acids, usually terephthalic acid. In the second type, the polyester units contain an isocyanurate group, normally the group derived from tris-(2-hydroxyethyl) isocyanurate (THEIC), in place of the polyfunctional aliphatic alcohol. In both cases, the polyesterimide contains imide units derived normally from an aromatic diamine, such as methylenedianiline, and a polyfunctional carboxylic acid or acid/anhydride (normally trimellitic anhydride).

The type of polyesterimide which contains aliphatic polyols is usually classified as having a thermal resistance less than Class 180 according to the NEMA standard. The type of polyesterimide which contains isocyanurate rings in the molecule normally is classified as Class 180 or higher according to the NEMA standard. The latter type of polyesterimide wire enamel is described in U.S. Pat. No. 3,426,098.

Likewise, it is also known that there are two different types of polyester wire enamels. One type is based on polyester in which there are polyfunctional aliphatic alcohols but no isocyanurate rings. Wire enamels of this type are generally rated as Class 155 according to the NEMA standard. The other type is based on a polyester in which there are polyol units which contain an isocyanurate ring. These wire enamels normally are rated as over Class 180 according to the NEMA standard. This type of polyester is described in U.S. Pat. No. 3,342,780.

Whether they contain an isocyanurate ring in the molecule or not, polyester wire enamels normally require nylon or polyamideimide topcoat for the majority of their applications.

Among the base resins mentioned above, the only resin which can provide a reasonably solderable high-temperature resistant magnet wire enamel is polyesterimide not containing an isocyanurate ring in the molecule. However, in order to make the material solderable, a substantial reduction in the molecular weight is required in this type of polyesterimide. Unfortunately, this reduction in molecular weight of the base resin leads to a deterioration of the high-temperature resistance properties of the wire enamel. Furthermore, even when the molecular weight of the polyesterimide is reduced, the solderability of these wire enamels is still insufficient in terms of speed of soldering and the low temperature needed for soldering.

The only base resin which provides wire meeting the requirement for fast-speed and low-temperature soldering is conventional polyurethane. Polyurethanes are polymers produced by reaction of a polyfunctional isocyanate and a prepolymer containing free hydroxyl groups. The free hydroxyl groups may be provided, for example, by polyesters or polyethers. Such a polyurethane resin is shown in U.S. Pat. No.3,174,950 wherein methylene bisphenylisocyanate is reacted with tris (2-hydroxyethyl) isocyanurate (THEIC). However, wire enamels based on this type of polymer cannot provide sufficient high-temperature resistance to meet the requirements of the Class F and Class H standards set by NEMA.

U.S. Pat. No. 3,869,428 describes a polyurethane enamel composition wherein the composition contains imide and urethane groups and is the reaction product of an aromatic hydroxyl group-containing compound and an aromatic isocyanate, wherein one of these reactants contains imide groups. The composition according to U.S. Pat. No. 3,869,428 is said to result in solderability comparable with polyurethane enamels and temperature resistance properties comparable to polyesterimide enamels.

SUMMARY OF THE INVENTION

In accordance with the present invention, polyurethane wire enamels are provided which can produce good heat resistance and fast soldering of magnet wire. These wire enamels will provide an electrical insulation for magnet wire which meets all the requirements of Class F insulation according to NEMA standard.

Magnet wire derived from these wire enamels provide wire meeting the NEMA requirements for Class F or higher ratings which also passes the heat shock test at 200° to 220° C. in contrast to the 175° C. heat shock obtained from current Class F solderable polyesterimide. This heat shock test is performed on wire that is 20% prestretched and wound on a mandrel and kept for 30 minutes at the corresponding temperature. To pass the test, the coating on the wire must not crack.

It has been found, furthermore, that the polyesterimide resin of this invention which contains isocyanurate rings in the molecule and which is produced from aromatic carboxylic acids, when compounded into a polyurethane enamel, provides a thermal index temperature high enough to replace the presently used Class F solderable polyesterimide. When the polyesterimide-type resin, containing no isocyanurate rings, which is used in currently available Class F or H enamels, is formulated with blocked isocyanate to make a polyurethane enamel, the resultant enamel has certain desirable electrical properties, but cannot match the thermal index of the presently used Class F solderable polyesterimide.

Polyurethane enamels according to the present invention will permit magnet wire manufacturers to take advantage of faster running speeds and lower baking temperatures than are presently required for Class F solderable polyesterimide wire enamel. In addition, the users of wire coated with these wire enamels will enjoy faster and lower-temperature soldering compared with that of present Class F solderable polyesterimide. Furthermore, the polyurethane wire enamel of this invention provides better heat shock than the presently used Class F solderable polyesterimide.

DETAILED DESCRIPTION OF PREFERRED EMBODIMENTS

In accordance with the present invention, polyurethane wire enamels are formulated by mixing polyesterimide polymers with blocked isocyanates.

The polyesterimide resins used in producing the polyurethanes of the present invention are made by reaction of polyester-forming components and imide-forming components. The main part of the technology required to synthesize such polyesterimide resins is described in U.S. Pat. No. 3,426,098.

The polyester-forming components, described in more detail below, include alcohols and aromatic carboxylic acids. The imide-forming components, also described in more detail below, include mono anhydrides of aromatic carboxylic acids and aromatic diamine.

In the polyesterimide resin according to the present invention, at least 16 equivalent percent up to 60 equivalent percent of the hydroxyl functional groups in the raw materials are provided by hydroxyl groups attached to the isocyanurate rings such as the hydroxyl functional groups of THEIC. When the above mentioned percentage (by equivalents) of the hydroxyl functional groups is less than 40%, at least 35% imide linkages are needed in the total of imide and ester linkages; otherwise, sufficient heat shock as well as Class F thermal endurance cannot be obtained while maintaining adequate solderability. When the percentage (by equivalents) of the hydroxyl functional groups provided by hydroxyl groups attached to isocyanurate is higher than 40 equivalent percent, at least 16 equivalent percent imide linkages (in the total imide and ester linkages) are sufficient to provide good heat shock value while maintaining adequate solderability.

While the highest percentage of THEIC in the compounds providing hydroxyl functional groups is that which provides almost 60 equivalent percent of the hydroxyl groups, as mentioned above, the highest equivalent percent of imide linkages (in the total of imide and ester groups) is 50%, but preferably 45%.

The OH/COOH ratio of the raw materials used for making the polyesterimides should be about 1.4:1 to 2.5:1. If this ratio becomes less than 1.4, then solderability will deteriorate and if this ratio is more than 2.5, the molecular weight of polyesterimide will diminish below that needed in a high Class F polyurethane enamel to be used in place of Class F solderable polyesterimide.

As the imide-forming components, the following can be used: (a) an anhydride such as trimellitic anhydride or other mono or polycylic monoanhydrides containing 1 to 3 non-adjacent carboxyl groups, or mono- or polycycloaliphatic monoanhydrides containing 1 to 3 non-adjacent carboxyl groups and having 5 or more carbons in the cycloaliphatic ring, and (b) polyamine, preferably aromatic diamines, including methylene dianiline, benzidine, 3,3'-diamino diphenyl, 1,4-diamino naphthalene, p-phenylene diamine, 4,4'-diamino diphenyl ether, 4,4-dimethyl heptamethylene diamine -1,7, diamino diphenyl ketone, m-phenylene diamine, xylene diamine, hexamethylene diamine, ethylene diamine, 4,4'-dicyclohexylmethane diamine, diamino diphenyl sulfone. The preferred anhydride is trimellitic anhydride and the preferred diamines are methylene dianiline and oxydianiline.

Reactants (a) and (b) are usually employed in an amount of approximately 2 moles of (a) per mole of (b) to form the diimide diacid. Generally, 1.92 to 2.08 mole of the anhydride are used per mole of diamine although the anhydride can be used in greater excess. The reaction product of two moles of trimellitic anhydride and 1 mole of aromatic diamine has the formula

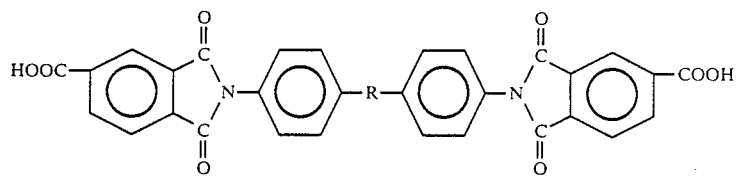

where R is 0 in the case of oxydianiline or CH$_2$ in the case of methylene dianiline. Also, it should be noted that the same structure may be formed by prereacting 1 mole of the corresponding diisocyanate, for example, 4,4'-diisocyanato diphenyl ether in place of 4,4'-diamino diphenyl ether or 4,4'-diisocyanato diphenyl methane in place of methylene dianiline, etc. and 2 moles of trimellitic anhydride can also be used satisfactorily in the polyesterimide of this invention.

The polyester-forming components, as noted above, include alcohols and carboxylic acids. The alcohols which can be used in the polyester-forming components of the polyesterimide include polyhydric alcohols containing three or more hydroxyl groups, and diols. The polyhydric alcohols include THEIC and other polyhydric alcohols containing isocyanurate groups as well as saturated aliphatic alcohols such as glycerine, pentaerythritol, 1,1,1-trimethylolethane, 1,1,1-trimethylolopropane and dipentaerythritol. As the diol component, ethylene glycol is preferred, but butanediol-1,4, trimethylene glycol, propylene glycol, pentanediol-1,5, neopentylene glycol and butene-2-diol-1,4 may be used. When THEIC is used, preferably at least 20 equivalent percent of the total alcohol component is from this material. Preferably, THEIC is the only polyfunctional alcohol component and the only other alcohols present are dihydric alcohols, preferably ethylene glycol.

The preferred carboxylic acids used in the polyester-forming components are aromatic carboxylic acids, of which dicarboxylic acids, especially terephthalic acid and isophthalic acid are particularly preferred. These acids can be totally replaced by ester-forming derivatives, such as their dimethyl esters or anhydrides. Other carboxylic acids or derivatives which may be used include adipic acid, orthophthalic anhydride, hemimellitic acid, trimellitic anhydride, succinic acid, tetrahydrophthalic acid, maleic acid, or sebacic acid. Preferably, the carboxylic acids used are all aromatic carboxylic acids, and preferably at least 80 equivalent percent of the carboxylic acids are terephthalic acid or isophthalic acid (or their ester forming derivatives).

In the event that acids containing three or more carboxyl groups are used, adjustments may be required in the composition of the alcohol component. It will be noted that the degree of cross-linking in the final product depends in part on the proportions of difunctional and polyfunctional components in the polyesterimide. Thus, if a higher proportion of the acid is polyfunctional, it may be desirable to use a relatively higher proportion of diol in the alcohol component.

The blocked polyisocyanates used in accordance with the present invention are polyisocyanate derivatives which contain isocyanate groups which are non-reactive at ordinary temperatures but which liberate isocyanate groups at elevated temperatures. They are derived by reaction of polyisocyanates with blocking agents such as phenols or other alcohols as described below.

The preferred isocyanates that can be used to obtain the blocked isocyanates are diphenylmethane diisocyanate, diphenyl sulfone diisocyanate, diphenyl ether diisocyanate and urethane condensates of them with a polyhydric alcohol such as trimethylol propane. Toluene diisocyanates can also be used. However, toluene diisocyanates may generate toxic fumes during the soldering operation. Therefore, less volatile isocyanates are preferred. The preferred diisocyanate is diphenylmethane diisocyanate.

Diphenylmethane diisocyanate (or similar diisocyanates) is preferred over the use of toluene diisocyanate for the additional reason that the polyurethane product which results provides far better heat shock performance and is more likely to produce pinhole free magnet wire.

As the blocking agent for producing the blocked isocyanate polymers, cresylic acid is preferred, but similar materials such as phenol itself or alkylated phenols in which the alkyl group or groups contain up to a total of nine carbon atoms etc. can be used.

Alcohol type blocking agents may be used in conjunction with the phenol type blocking agents, such as ethylene glycol, propylene glycol, diethylene glycol, glycerine, pentaerythritol, 1,1,1-trimethylolpropane, neopentyl glycol, hydantoin glycol, butene diol-1,4, trimethylene glycol, 1,3-cyclobutane diol. Mono-functional alcohols such as benzyl alcohol can also be employed. However, the use of mono functional alcohol should be limited so that a proper polymeric blocked isocyanate can be produced. THEIC itself can be employed as an alcoholic blocking agent as has been described in U.S. Pat. No. 3,174,950 or Japanese Patent Application SH059-204610 from Showa Densen Co., Ltd. However, polyurethanes made using THEIC as a blocking agent were found to have poor heat shock and soldering properties as is shown in examples which follow.

The ratio of isocyanate groups provided by the blocked isocyanate to free hydroxyl groups in the polyesterimide, in the final polyurethane formulation, should be from 0.82:1 to 1.50:1 to maintain well balanced properties in the polyurethane enamel to be used in place of Class F solderable polyesterimide. Further, the weight of hydroxyl functional groups provided by THEIC, as a proportion of the total weight of these groups in the polyesterimide resin in the final polyurethane enamel, should be at least 45%, otherwise the thermal resistance of the enamel is adversely affected.

The following examples are given solely for the purposes of illustration and are not to be considered as limiting the invention to these embodiments.

EXAMPLE #1

Preparation of Blocked Isocyanate

The following raw materials were used:

| A. Xylol | 156 Wt. Parts |
|---|---|
| B. Solvesso #100 | 156 Wt. Parts |
| C. 4,4'-diphenylmethane-diisocyanate | 486 Wt. Parts |
| D. Trimethylolpropane | 78 Wt. Parts |
| E. Cresylic Acid | 323 Wt. Parts |
| F. Cresylic Acid | 423 Wt. Parts |
| G. C.P. Phenol | 436 Wt. Parts |

Into a three-liter flask equipped with a condenser, agitator, thermometer and dropping funnel, were placed material "A" and "B" first, then material "C" was rapidly loaded into the reaction kettle. The batch was heated to reach a temperature of 48° C. When this temperature was reached, material "D" was added slowly while the temperature of the batch was kept under 85° C. After all the material "D" was added to the kettle, material "E" was added slowly through the dropping funnel while the temperature of the batch was kept under 87° C. After all the material "E" was added to the batch, the batch was held at 87°-90° C. for one hour. The temperature of the batch was then gradually raised to 110° C. and held this temperature for 2 hours, and then reduced by adding the materials "F" and "G". The final material obtained had a viscosity of "X and ½" by Gardner-Holdt viscosity measurement and a solid content of 42% determined by placing 2 grams of the sample for one hour at 150° C. in a forced air oven.

EXAMPLE #2

Preparation of Polyesterimide Resin

The following raw material were used:

| A. Ethylene Glycol | 129 Wt. Parts |
|---|---|
| B. Tris (2-hydroxyethyl) | 243 Wt. Parts |

| | |
|---|---|
| isocyanurate | |
| C. Trimellitic Anhydride | 233 Wt. Parts |
| D. Methylene Dianiline | 120 Wt. Parts |
| E. Terephthalic Acid | 290 Wt. Parts |

The above mentioned mixture was placed into the reaction vessel equipped with a thermometer, stirrer and a Dean-Stark trap which is connected to the condenser. The batch temperature was increased over a period of 15 hours to 460° F. The reaction was continued at this temperature until the check cut viscosity of "V-V½" (by Gardner-Holdt Method as 30% solid in cresylic acid) was obtained. Then the batch was collected as 100% solid.

EXAMPLE #3

Preparation of Polyurethane Wire Enamel

The following raw materials were used:

| | |
|---|---|
| A. Xylene | 140 Wt. Parts |
| B. Cresylic Acid | 48 Wt. Parts |
| C. C.P. Phenol | 61 Wt. Parts |
| D. Polyesterimide Resin of Example #2 | 100 Wt. Parts |
| E. Blocked Isocyanate of Example #1 | 455 Wt. Parts |
| F. Triethylenediamine | 0.35 Wt. Parts |
| G. Dibutyl-tin-dilaurate | 0.35 Wt. Parts |

Materials "A", "B" and "C" were mixed and then material "D" was added. The batch was heated to 180° F. with agitation. The batch temperature of 180° F. was maintained until all the material "D" was dissolved.

Then the batch temperature was reduced to 140° F. and the materials "E", "F" and "G" were added. The batch was mixed well before being filtered through the Kruger Filter. The final viscosity of the enamel was "K" by the Gardner-Holdt Method and the solid content was 30.6% determined by checking a 2 gram sample at 200° C. for 2 hours. (All solids measurements described below were determined by this same method unless otherwise specified).

EXAMPLE #4

Preparation of Polyesterimide Resin

The following raw materials were used:

| | |
|---|---|
| A. Cresylic Acid | 90 Wt. Parts |
| B. Ethylene Glycol | 86 Wt. Parts |
| C. Neopentyl Glycol | 37 Wt. Parts |
| D. THEIC | 75 Wt. Parts |
| E. Terephthalic Acid | 71 Wt. Parts |
| F. Trimellitic Anhydride | 192 Wt. Parts |
| G. Methylene Dianiline | 99 Wt. Parts |

The above mentioned materials were reacted in a manner similar to that described in Example #2 until a check cut viscosity (as 33% sample resin in cresylic acid) of "S½" by Gardner-Holdt Method was obtained. The only difference for the reaction was the use of cresylic acid to minimize the hard caking during the process due to the formation of amic acid. The batch was then collected as solid resin.

EXAMPLE #5

Preparation of Polyurethane Enamel

The following materials were used:

| | |
|---|---|
| A. Cresylic Acid | 53 Wt. Parts |
| B. C.P. Phenol | 42 Wt. Parts |
| C. Xylene | 140 Wt. Parts |
| D. Polyesterimide Resin of Example #4 | 117 Wt. Parts |
| E. Blocked Isocyanate of Example #1 | 453 Wt. Parts |
| F. Triethylenediamine | 0.35 Wt. Parts |
| G. Dibutyl-tin-dilaurate | 0.35 Wt. Parts |

This enamel was prepared by the same manner described in Example #3. Final viscosity of the enamel by Gardner-Holdt Method was "L" while the solid content was 33.37%.

EXAMPLE #6

Preparation of Polyesterimide Resin

The following materials were used:

| | |
|---|---|
| A. Cresylic Acid | 1075 Wt. Parts |
| B. Ethylene Glycol | 1433 Wt. Parts |
| C. THEIC | 1438 Wt. Parts |
| D. Terephthalic Acid | 861 Wt. Parts |
| E. Trimellitic Anhydride | 2794 Wt. Parts |
| F. Methylene dianiline | 1442 Wt. Parts |
| G. Tetrabutyltitanate | 0.1 Wt. Parts |

The above mentioned materials were reacted in a similar manner to that described in Example #2. The only difference for the reaction was the use of cresylic acid to minimize hard caking during the process due to the formation of amic acid. This batch was cooked to obtain a check cut vicosity of "U" (as 33% solid in cresylic acid) by the Gardner-Holdt Method.

EXAMPLE #7

Preparation of Polyurethane Wire Enamel

The following materials were used:

| | |
|---|---|
| A. Cresylic Acid | 56 Wt. Parts |
| B. Xylene | 140 Wt. Parts |
| C. C.P. Phenol | 42 Wt. Parts |
| D. Polyesterimide Resin of Example #6 | 114 Wt. Parts |
| E. Blocked isocyanate of Example #1 | 453 Wt. Parts |
| F. Triethylenediamine | 0.35 Wt. Parts |
| G. Dibutyl-tin-dilaurate | 0.35 Wt. Parts |

The above mentioned materials were converted to a wire enamel in the same manner as described in Example #3. The final viscosity obtained was "L" by the Gardner-Holdt Method while the solid content was 30.4%.

EXAMPLE #8

Preparation of Polyesterimide Resin

The following materials were used:

| | |
|---|---|
| A. Cresylic Acid | 142 Wt. Parts |
| B. Neopentyl Glycol | 111 Wt. Parts |
| C. THEIC | 70 Wt. Parts |

-continued

| D. Trimellitic Anhydride | 384 Wt. Parts |
| E. Methylene Dianiline | 198 Wt. Parts |

The above mentioned materials were reacted in a similar manner to that described in Examples #2 and #6. The check cut viscosity as 33% solid in cresylic acid was "V".

EXAMPLE #9

Preparation of Polyurethane Enamel

The following materials were used:

| A. Cresylic Acid | 53 Wt. Parts |
| B. Xylene | 140 Wt. Parts |
| C. C.P. Phenol | 42 Wt. Parts |
| D. Polyesterimide Resin of Example #8 | 117 Wt. Parts |
| E. Blocked isocyanate of Example #1 | 453 Wt. Parts |
| F. Triethylenediamine | 0.35 Wt. Parts |
| G. Dibutyl-tin-dilaurate | 0.35 Wt. Parts |

The above mentioned materials were converted to a wire enamel in the same manner as described in Example #3. The final viscosity of the enamel was "M$\frac{1}{2}$" by the Gardner-Holdt Method while the solid content was 32.0%.

EXAMPLE #10

Preparation of Polyurethane Enamel

The following materials were used:

| A. Cresylic Acid | 35 Wt. Parts |
| B. C.P. Phenol | 62 Wt. Parts |
| C. Xylene | 135 Wt. Parts |
| D. Polyesterimide of Example #2 | 86 Wt. Parts |
| E. Blocked isocyanate of Example #1 | 487 Wt. Parts |
| F. Dibutyl-tin-dilaurate | 0.35 Wt. Parts |
| G. Triethylenediamine | 0.35 Wt. Part |

The above mentioned materials were mixed in a similar manner to that described in Example #3. The final viscosity of the enamel was "L$\frac{1}{2}$" by the Gardner-Holdt Method while the solid content was 30.5%.

EXAMPLE #11

Preparation of Polyesterimide Resin

The following materials were used:

| A. Cresylic Acid | 152 Wt. Parts |
| B. Ethylene Glycol | 144 Wt. Parts |
| C. THEIC | 135 Wt. Parts |
| D. Trimellitic-anhydride | 454 Wt. Parts |
| E. Methylene dianiline | 217 Wt. Parts |

The above mentioned materials were reacted in a similar manner to that described in Example #2 and #6. The check cut viscosity obtained as 33% solid in cresylic acid was "W".

EXAMPLE #12

Preparation of Polyurethane Enamel

The following materials were used:

| A. Cresylic Acid | 52 Wt. Parts |
| B. C.P. Phenol | 42 Wt. Parts |
| C. Polyesterimide Resin of Example #11 | 118 Wt. Parts |
| D. Xylol | 140 Wt. Parts |
| E. Blocked isocyanate of Example #1 | 453 Wt. Parts |
| F. Triethylene diamine | 0.35 Wt. Parts |
| G. Dibutyl-tin-dilaurate | 0.35 Wt. Parts |

The above mentioned materials were mixed and converted into the wire enamel by a process similar to that described in Example #3. The final viscosity was "R$\frac{3}{4}$" by the Gardner-Holdt Method while its solid content was 30.5%.

EXAMPLE #13

Preparation of Polyesterimide Resin

The following raw materials were used:

| A. Cresylic Acid | 81 Wt. Parts |
| B. Ethylene Glycol | 128 Wt. Parts |
| C. THEIC | 179 Wt. Parts |
| D. Trimellitic Anhydride | 240 Wt. Parts |
| E. Methylene dianiline | 117 Wt. Parts |
| F. Terephthalic Acid | 83 Wt. Parts |

The above mentioned materials were reacted in a similar manner to that described in Example #2 and #6. The batch was terminated at the time when a total distillation of 68 ml. was collected.

EXAMPLE #14

Polyurethane Enamel

The following materials were used:

| A. Cresylic Acid | 52 Wt. Parts |
| B. C.P. Phenol | 42 Wt. Parts |
| C. Xylol | 140 Wt. Parts |
| D. Polyesterimide Resin of Example #13 | 118 Wt. Parts |
| E. Blocked isocyanate of Example #1 | 453 Wt. Parts |
| F. Triethylenediamine | 0.35 Wt. Parts |
| G. Dibutyl-tin-dilaurate | 0.35 Wt. Parts |

The above mentioned materials were mixed in the same manner described in Example #3. The final viscosity was "N$\frac{1}{4}$" while the solid content was 30.2%.

The wire enamels prepared in Example #3, #5, #7, #9, #10, #12, and #14 were applied to 1.024 mm copper wire by using General Electric type M two head laboratory oven at a running speed of 45 to 60 feet/min. (a conventional Class F solderable polyesterimide wire enamel can be applied at 45 feet per min. on the same equipment to obtain optimum results in electrical properties) by using a temperature of 800° F. for the radiant panel, 400° F. for the bottom zone and 700° F. for the top zone (a conventional Class F solderable polyesterimide needs to be run at 900° F. for the radiant panel temperature, at 500° F. for the bottom zone and at 800° F. for the top zone temperature).

TABLE 1

| Example No. | 3 | 5 | 5 | 7 | 7 | 9 | 9 | 10 | 10 | 12 | 12 | 14 |
|---|---|---|---|---|---|---|---|---|---|---|---|---|
| BUILD (INCHES) | .0431 | .0430 | .0430 | .0429 | .0430 | .0429 | .0430 | .0429 | .0430 | .0430 | .0431 | .0430 |
| BARE (INCHES) | .0401 | .0400 | .0400 | .0400 | .0400 | .0400 | .0400 | .0400 | .0400 | .0400 | .0400 | .0400 |
| COAT (MILS) | 3.0 | 3.0 | 3.0 | 2.9 | 3.0 | 2.9 | 3.0 | 2.9 | 3.0 | 3.0 | 3.1 | 3.0 |
| RUN SPEED (FT/MIN) | 50 | 45 | 50 | 45 | 50 | 50 | 60 | 45 | 50 | 50 | 60 | 50 |
| RADIANT PANEL TEMP (°F.) | 800 | 800 | 800 | 800 | 800 | 800 | 800 | 800 | 800 | 800 | 800 | 800 |
| ZONE I TEMP. (°F.) | 400 | 400 | 400 | 400 | 400 | 400 | 400 | 400 | 400 | 400 | 400 | 400 |
| ZONE II TEMP. (°F.) | 700 | 700 | 700 | 700 | 700 | 700 | 700 | 700 | 700 | 700 | 700 | 700 |
| CUT THROUGH (2000 G) °C. | 295 | 255 | 280 | 260 | 280 | 260 | 265 | 265 | 285 | 270 | 255 | 260 |
| HEAT SHOCK 20% PRESTRETCH | | | | | | | | | | | | |
| 30 MIN. 220° C. 1X | | 10 | 0 | 0 | 0 | | | | | | | |
| 2X | | 60 | 10 | 20 | 10 | | | | | | | |
| 3X | | 80 | 40 | 60 | 60 | | | | | | | |
| 4X | | 90 | 50 | 60 | 70 | | | | | | | |
| 30 MIN. 200° C. 1X | | 80 | 60 | 50 | 40 | 40 | 40 | 0 | 50 | 20 | 10 | 0 |
| 2X | | 80 | 80 | 70 | 70 | 70 | 60 | 60 | 70 | 70 | 80 | 10 |
| 3X | | 90 | 80 | 80 | 90 | 100 | 90 | 90 | 80 | 90 | 90 | 70 |
| 4X | | 100 | 100 | 90 | 100 | 100 | 100 | 100 | 90 | 100 | 90 | 80 |
| 30 MIN. 175° C. 1X | 10 | | | | | | | | | | | |
| 2X | 50 | | | | | | | | | | | |
| 3X | 80 | | | | | | | | | | | |
| 4X | 90 | | | | | | | | | | | |
| 30 MIN. 175° C. 1X | | | | | | | | | | 60 | | 50 |
| (AFTER 6 MONTHS 2X | | | | | | | | | | 80 | | 90 |
| SHELF AGING) 3X | | | | | | | | | | 90 | | 90 |
| 4X | | | | | | | | | | 100 | | 100 |
| SOLDERING 60/40 TIN, LEAD | | | | | | | | | | | | |
| AT 850° F. (SEC) | | | | | | | | | | | | |
| 750° F. (SEC) | 4 | 3 | 3 | 2 TO 3 | 2 TO 3 | 3 | 2.5 | 3 | 3 | 3 | 3 | 3 |
| 700° F. (SEC.) | 9 | | | | | | | | | | | |
| ASTM D-2307 THERMAL ENDURANCE (HOURS) | | | | | | | | | | | | |
| AT 240° C. | | | | | | | | | | | | |
| AT 220° C. | 612 | | | | | | | | | | | |
| AT 200° C. | 4824 | | | | | | | | | | | |
| AT 180° C. | 13521 | | | | | | | | | | | |
| INTERPOLATED 20,000 HRS. | 177° C. | | | | | | | | | | | |

Review of table 1 will show the improved heat shock value and soldering speed of the present invention. Notably, Example 3 indicates the wire enamel developed at the beginning of the present work, while Examples Nos. 5, 7, 9, 10, 12, and 14 are improvements on the enamel of example 3.

The running speed of the materials shown in the examples of this invention are at least equal, but the majority of them are faster than, that of solderable polyesterimide.

Improved soldering speed is clearly shown by the enamels of the present invention. The majority of examples corresponding to the present invention solder in 3 seconds (actual range from 2.0 to 4.0 seconds) at 750° F. while the soldering speed of conventional solderable polyesterimide is 5 to 8 seconds at 850° F. Conventional solderable polyesterimide coated wire requires about a 13% higher temperature to solder, while the soldering speed is 1 to 6 seconds slower. Thus, the soldering speed of conventional solderable polyesterimide is on the average 100% slower than that of the present invention.

Overall, therefore, the production of polyurethane enamel by the present process results in a solderable wire coating of clearly superior properties.

Although only certain embodiments of the invention have been described in detail, it will be understood that modifications and variations may be made in details of composition and mode of operation while retaining the novel features and advantages of this invention. Accordingly, all such variations and modifications are intended to be within the scope of the appended claims.

What is claimed is:

1. A solderable polyurethane wire enamel composition comprising a mixture of (a) a blocked isocyanate and (b) polyesterimide resin, wherein said polyesterimide resin (b) comprises (i) units of a polyester of alcohols and at least one aromatic carboxylic acid and (ii) diimide dicarboxylic acid units, said alcohols including at least one alcohol which contains isocyanurate groups, and wherein said blocked isocyanate (a) is prepared from an isocyanate selected from the group consisting of diphenylmethane diisocyanate, diphenyl sulfone diisocyanate, and diphenyl ether diisocyanate or a urethane polymer derived by reaction of said isocyanate with an alcohol, the ratio of isocyanate groups in said blocked isocyanate to hydroxyl groups in said polyesterimide resin being about 0.82:1 to about 5.7:1 and the hydroxyl to carboxylic acid ratio of the raw materials used in preparing the polyesterimide being about 1.4:1 to about 2.5:1.

2. A solderable polyurethane wire enamel composition a set forth in claim 1 wherein the alcohol which contains isocyanurate groups comprises at least 16 equivalent percent and up to 60 equivalent percent of the alcohols in said polyesterimide units.

3. A solderable polyurethane wire enamel composition as set forth in claim 2 wherein at least 16 equivalent percent of the total number of imide and ester linkages of said polyesterimide are imide when the proportion of said isocyanurate group—containing alcohol is 40 or more equivalent percent, and wherein at least 35 equivalent percent of the total number of imide and ester linkages of said polyesterimide are imide when the proportion of said isocyanurate group—containing alcohol is less than 40 equivalent percent.

4. A solderable polyurethane wire enamel composition as set forth in claim 1 wherein the proportion of imide linkages in the total imide and ester linkages is at least 16 and up to 50 equivalent percent.

5. A solderable polyurethane wire enamel composition as set forth in claim 4 wherein the proportion of said imide linkages is up to 45 equivalent percent.

6. A solderable polyurethane wire enamel composition as set forth in claim 1 wherein the ratio of isocyanate groups to hydroxyl groups in the reaction ranges from 0.82:1 to 1.50:1.

7. A solderable polyurethane wire enamel composition as set forth claim 1 wherein said polyesterimide resin is formed by the reaction of an imide containing compound and an ester containing compound;
said imide containing compound being formed by the reaction of an anhydride and a polyamine; and
said ester containing compound being formed by the reaction of an alcoholic component and a carboxylic acid or an ester-forming derivative thereof.

8. A solderable polyurethane wire enamel composition as set forth in claim 7 wherein said anhydride is a mono or polycyclic anhydride containing 1 to 3 nonadjacent carboxyl groups or a mono or polycycloaliphatic monoanhydride containing 1–3 nonadjacent carboxyl groups and having 5 or more carbons in the cycloaliphatic ring.

9. A solderable polyurethane wire enamel composition as set forth in claim 8 in which said anhydride is trimellitic anhydride.

10. A solderable polyurethane wire enamel composition as set forth in claim 7 wherein said polyamine component is an aromatic diamine.

11. A solderable polyurethane wire enamel composition as set forth in claim 10 wherein said diamine is methylene dianiline, benzidine, 3,3'-diamino diphenyl, 1,4-diamino naphthalene, p-phenylene diamine, 4,4'-diamino diphenyl ether, 4,4-dimethyl heptamethylene diamine - 1,7, diamino diphenyl ketone, m-phenyl diamine, xylene diamine, hexamethylene diamine, ethylene diamine, 4,4'-dicyclohexylmethane diamine, diamino diphenyl sulfone or oxydianiline.

12. A solderable polyurethane wire enamel composition as set forth in claim 7 wherein said polyamine is methylene dianiline or oxydianiline.

13. A solderable polyurethane wire enamel composition as set forth in claim 12 wherein said alcoholic component contains tris-(2-hydroxyethyl) isocyanurate and a glycol component selected from the group consisting of ethylene glycol, butanediol-1,4, trimethylene glycol, propylene glycol, pentanediol-1,5, neopentylene glycol, butene 2-diol-1,4, and mixtures of these glycols.

14. A solderable polyurethane wire enamel composition as set forth in claim 13 in which said alcoholic component includes also a polyhydric alcohol selected from the group consisting of glycerine, pentaerythritol, 1,1,1-trimethylolethane, 1,1,1-trimethylolpropane, dipentaerythritol and mixtures of these.

15. A solderable polyurethane wire enamel composition as set forth in claim 7 wherein said alcoholic component comprises 16 to 60 equivalent percent tris-(2-hydroxyethyl) isocyanurate, the balance of said component being dihydric alcohols.

16. A solderable polyurethane wire enamel composition as set forth in claim 7 wherein the carboxylic acid or ester-forming derivative thereof is terephthalic acid or isophthalic acid or an ester-forming derivative thereof.

17. A solderable polyurethane wire enamel composition as set forth in claim 16 wherein terephthalic or isophthalic acid or an ester-forming derivative thereof comprises from 80 to 100 equivalent percent of the carboxylic acid component, the balance of said component being adipic acid, ortho phthalic anhydride, hemimellitic acid, trimellitic anhydride, succinic acid, tetrahydrophthalic acid, maleic acid, or sebacic acid.

18. A solderable polyurethane wire enamel as set forth in claim 1 in which the blocking agent for said blocked isocyanate is selected from the group consisting of phenol, cresylic acid and alkylated phenols in which the alkyl group or groups contain up to nine carbon atoms.

19. An electric conductor coated with a cured polyurethane wire enamel obtained by applying the solderable polyurethane wire enamel set forth in claim 1 to said conductor and heating the coated conductor.

20. A solderable polyurethane wire enamel composition comprising the reaction product of:
(A) a polyesterimide resin, said polyesterimide resin being formed by the reaction of a compound containing imide linkages and a compound containing ester linkages, said imide linkage-containing compound being formed by the reaction of trimellitic anhydride and methylene dianiline and said ester linkage containing compound being formed by the reaction of tris-(2-hydroxy-ethyl) isocyanurate, other dihydric alcohols, and terephthalic or isophthalic acid; and
(B) a blocked isocyanate compound prepared by the reaction of a urethane condensate of diphenylmethane diisocyanate and trimethylolproprane with cresylic acid, the ratio of isocyanate groups in said blocked isocyanate to hydroxyl groups in said polyesterimide resin being about 0.82:1 to about 5.7:1 and the hydroxyl to carboxylic acid ratio of the raw materials used in preparing the polyesterimide being about 1.4:1 to about 2.5:1.

* * * * *